Patented Aug. 29, 1944

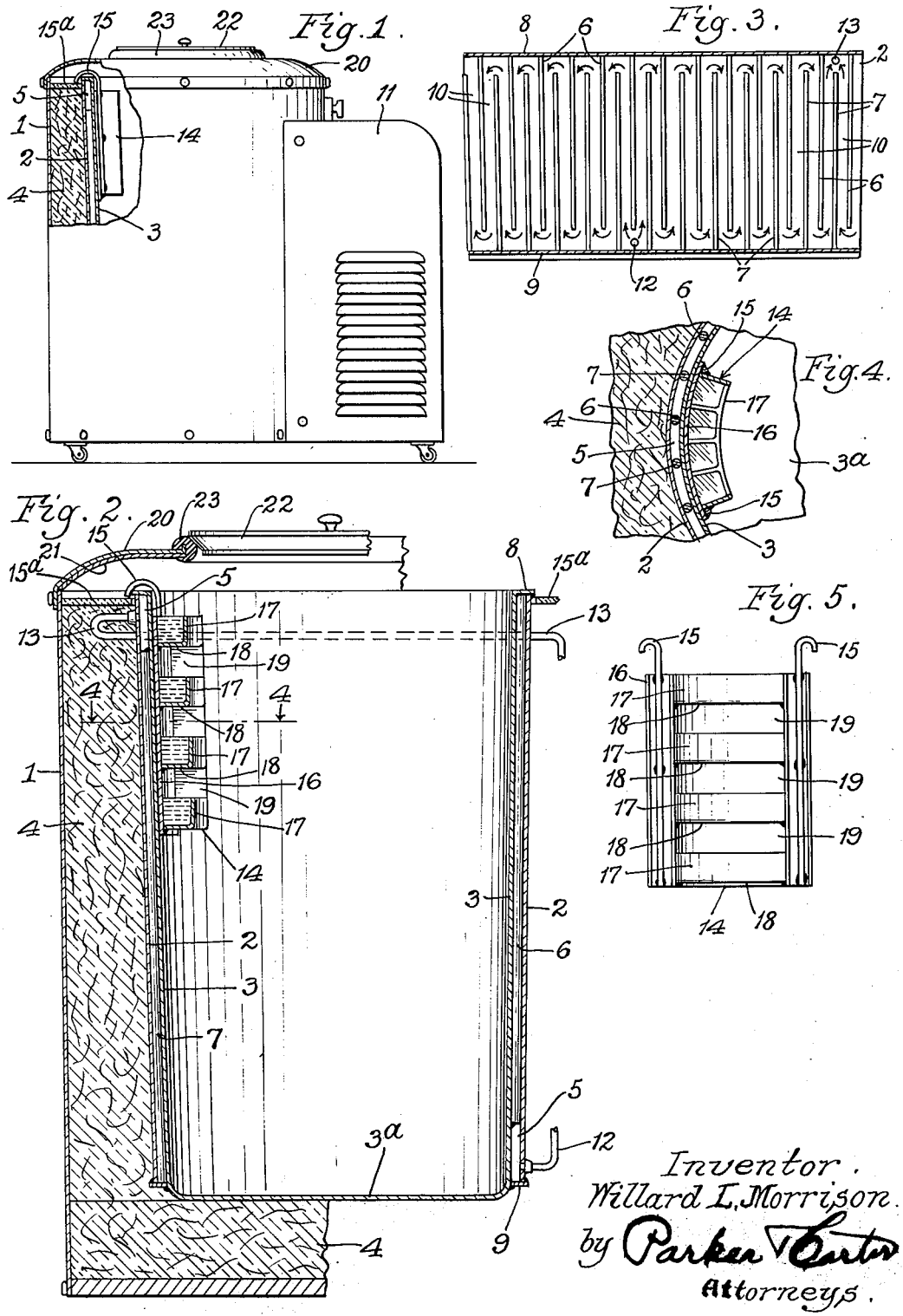

2,356,780

UNITED STATES PATENT OFFICE 2,356,780

APPARATUS FOR FREEZING FOODS

Willard L. Morrison, Lake Forest, Ill.

Application November 9, 1940, Serial No. 365,044

12 Claims. (Cl. 62—116)

This invention relates to apparatus for freezing foods and has for its object to provide a new and improved device of this description.

The invention has as a further object to provide a device for freezing foods which has an inner cylindrical metal food receptacle in which the food is frozen, which is larger in diameter at the top than at the bottom and is inclined inwardly from the top to the bottom, and a surrounding cylindrical enclosing device, there being a space between the two devices, with means for directing refrigerant material through said space to cool the inner food receptacle. The invention has as a further object to provide an apparatus for freezing foods having two cylindrical metal receptacles, one within the other and with a space between them, the inner metal receptacle being larger in diameter at the top than at the bottom, and inclining inwardly from the top to the bottom, and a vertically extending removable ice freezing device engaging the inner face of the inner receptacle, the incline of the inner face of the inner receptacle causing the force of gravity to maintain the ice freezing device in contact with the inner face of the inner receptacle. The invention has as a further object to provide an apparatus for freezing foods which has an inner cylindrical vertical metal receptacle in which the food is frozen, provided with a vertically extending removable ice molding device on the inner wall of this receptacle.

The invention has further objects which are more particularly pointed out in the accompanying description.

Referring now to the drawing, Fig. 1 is a side elevation with parts broken away, showing one form of apparatus embodying the invention;

Fig. 2 is an enlarged view in part section of the device shown in Fig. 1;

Fig. 3 is a view of the development of one of the receptacles, with the other receptacle removed, showing the passageway forming members between the two receptacles.

Fig. 4 is a sectional view taken on line 4—4 of Fig. 2;

Fig. 5 is a front elevation of one form of ice forming device.

Like numerals refer to like parts throughout the several figures.

Referring now to the drawing, there is illustrated an apparatus for freezing foods, wherein there is an outer cylindrical receptacle 1, preferably of metal. There is an intermediate cylindrical receptacle 2 which is also preferably of metal, and an inner cylindrical receptacle 3 of metal, the inner receptacle preferably having a bottom 3a which may be integral therewith or separate therefrom. Between the outer cylindrical receptacle 1 and the intermediate receptacle 2 is placed heat insulating material 4. This heat insulating material also extends under the bottom of the receptacles 2 and 3. The inner receptacle 3 is larger in diameter at the top than at the bottom and inclines inwardly from the top to the bottom. Located in the space 5 between the inner receptacle and the intermediate receptacle are two series of passageway forming members 6 and 7. The passageway forming members 6 extend to the upper end of the space between the receptacles and the passageway forming members 7 extend to the lower end of the space between the receptacles. The upper end of the space between the receptacles is sealed in any desired manner. One method of sealing the upper end of this space 5 is herein shown wherein the inner receptacle is provided with a flange 8 which extends entirely around the receptacles and is welded to the intermediate receptacle 2 so as to hermetically seal the upper end of this space 5. Any suitable sealing means may be used to seal the bottom of the space 5, such as the sealing ring 9 which is soldered or otherwise fastened to both receptacles, so as to hermetically seal the lower end of the space 5. This provides a continuous passageway 10 extending vertically back and forth along the space between the receptacles.

A refrigerant apparatus 11 is associated with the receptacles and is provided with the usual motor, compressor, condenser, expansion valve and tank or liquid receiver, all enclosed within a suitable casing. The refrigerant material from the compressor enters the passageway 10 through the inlet 12 and passes in both directions back and forth through this passageway 10, so as to cool the inner receptacle 3. The two sections of the refrigerant material join on opposite sides of the receptacles and pass out through the outlet 13 back to the refrigerating apparatus.

If and when it is desired to form ice blocks, there is provided one or more removable ice forming devices 14 which extend vertically along the inner wall of the inner receptacle 3 and are loosely supported in position in any desired manner, as by means of the supports 15 which engage the upper edges of the receptacles 2 and 3. The edges of these receptacles preferably project a short distance above the insulation so that the supports 15 may be made in the form of hooks so as to hook over these edges to insure the ice molding device being held in position, see Fig. 2. There is preferably a ring of solid insulating material 15a located at the top and between the outer receptacle 1 and the intermediate receptacle 2.

The ice forming device or devices are provided with a curved outer wall 16 shaped to fit the curved inner face of the receptacle 3. Since the receptacle 3 is larger in diameter at the top than at the bottom, the force of gravity is utilized to cause the ice molding device to be pressed against the inner face of the receptacle 3 and properly engage the receptacle, that is, to cause the outer wall 16 of the ice molding device to make good contact with the inner face of the wall of the receptacle 3.

The ice forming device is provided with a series of ice block forming elements, which may be formed and arranged in any desired manner. As herein shown, these ice block molding elements consist of angle pieces which when in position have the substantially vertical members 17 and the substantially horizontal members 18, the edges of the members 18 being fastened to the outer wall 16 in any desired manner, as by welding. There are end closing members for closing the ends of the ice block molding elements and there may be intermediate cross pieces to divide the space into a plurality of spaces so as to form a plurality of ice blocks side by side, as clearly shown in Fig. 4. The block molding elements are spaced apart, that is, they are separated by spaces 19 for the removal of the ice blocks, which is done by removing the ice molding device and removing the blocks in the usual way. The ice molding device may be of any suitable material as now used, such as rubber or metal, but preferably of metal. With the outer wall 16 making good contact with the cold inner face of the inner receptacle 3, there is formed a quick freezing ice forming device which forms the ice blocks in much less time than they are now formed in the refrigerators in use.

There is a tendency for the temperature at the top of the receptacle formed by the round receptacle 3 to be somewhat higher than the temperature at the bottom. By having the receptacles 2 and 3 inclined inwardly from the top to the bottom, the space between the round receptacles 2 and 3 for the refrigerant material is thus larger at the top than at the bottom, so that there will be more refrigerant material at the top of this space than at the bottom, and this tends to compensate for the difference in temperature and bring the temperature more nearly the same at the bottom and the top.

The device is provided with a cover 20, preferably of metal and which preferably has on its inner face a lining 21 of heat insulating material, such as cork or the like. This cover has an opening for a lid 22 by means of which access to the inner receptacle 3 is secured. There is preferably a non-metallic member 23 around the edge of the opening in the cover 20, into which the lid 22 fits. The opening for the lid is smaller in diameter than the opening in the top of the receptacle 3 and is preferably centrally located with relation to the receptacle 3.

The ice molding device is so suspended in position as to be free to move laterally toward the inner face of the wall of the inner receptacle under the influence of the force of gravity, so that the force of gravity assists in pressing the substantially vertical face of the ice forming device against the substantially vertical face of the inner receptacle. In the construction shown this is accomplished by loosely mounting the ice forming device by means of the hooks 15. The points of the hooks loosely engage a carrying member and this point of engagement is preferably in a plane on the opposite side of the wall of the inner receptacle from that where the ice molding device is located, that is the points of engagement of the hooks and the ice molding device are on opposite sides of the inner receptacle.

I claim:

1. An apparatus for freezing foods comprising an outer substantially cylindrical receptacle, an intermediate substantially cylindrical receptacle on the interior of the outer substantially cylindrical receptacle, heat insulating material between the outer receptacle and the intermediate receptacle, an inner substantially cylindrical food receptacle, the intermediate receptacle and the inner food receptacle being separated by a space sealed at its upper and lower ends, means for passing refrigerant material through said space between the inner food receptacle and the intermediate receptacle, the wall of the inner food receptacle being inclined inwardly from the top toward the bottom, and a liquid container having a liquid holding receptacle and which constitutes an ice molding device supported on the interior of the inner food receptacle, the incline of the wall thereof causing the force of gravity to press the liquid holding receptacle against said wall.

2. An apparatus for freezing foods comprising an outer substantially cylindrical receptacle, an intermediate substantially cylindrical receptacle on the interior of the outer substantially cylindrical receptacle, heat insulating material between the outer receptacle and the intermediate receptacle, an inner substantially cylindrical food receptacle, the intermediate receptacle and the inner food receptacle being separated by a space sealed at its upper and lower ends, means for passing refrigerant material through said space between the inner food receptacle and the intermediate receptacle, the wall of the inner food receptacle being inclined inwardly from the top toward the bottom, an ice molding device supported on the interior of the inner food receptacle, the incline of the wall thereof causing the force of gravity to press the ice molding device against said wall, said ice molding device having an outer wall which engages the inner face of the inner food receptacle, and a series of ice block molding elements connected with said outer wall and extending therealong.

3. An apparatus for freezing foods comprising an outer substantially cylindrical receptacle, an intermediate substantially cylindrical receptacle on the interior of the outer substantially cylindrical receptacle, heat insulating material between the outer receptacle and the intermediate receptacle, an inner substantially cylindrical food receptacle, the intermediate receptacle and the inner food receptacle being separated by a space sealed at its upper and lower ends, means for passing refrigerant material through said space between the inner food receptacle and the intermediate receptacle, the wall of the inner food receptacle being inclined inwardly from the top toward the bottom, and an ice molding device supported on the interior of the inner food receptacle, the incline of the wall thereof causing the force of gravity to press the ice molding device against said wall, said ice molding device having an outer wall which engages the inner face of the inner food receptacle, and a series of ice block molding elements connected with said outer wall and extending therealong, said ice block molding elements being separated by spaces through which the ice blocks are removed.

4. An apparatus for freezing foods comprising an outer substantially cylindrical receptacle, an intermediate substantially cylindrical receptacle on the interior of the outer substantially cylindrical receptacle, heat insulating material between the outer receptacle and the intermediate receptacle, an inner substantially cylindrical food receptacle, the intermediate receptacle and the inner food receptacle being separated by a space sealed at its upper and lower ends, means for passing refrigerant material through said space between the inner food receptacle and the intermediate receptacle, the wall of the inner food receptacle being inclined inwardly from the top toward the bottom, an ice molding device supported on the interior of the inner food receptacle, the incline of the wall thereof causing the force of gravity to press the ice molding device against said wall, said ice molding device having an outer wall which engages the inner face of the inner food receptacle, and ice block molding devices comprising a series of angle elements, each having a vertical member and a horizontal member, the horizontal members being connected with said outer wall and the vertical members being substantially parallel to said outer wall, and end closing members for closing the ends of said ice block molding devices.

5. An apparatus for freezing foods comprising a substantially cylindrical food receptacle open at one end and closed at the other end and larger in diameter at one end than at the other end, so that the wall thereof is inclined inwardly from the top toward the bottom so that when ice molding devices, having water receptacles with walls curved similar to the wall of the food receptacle, are suspended on the interior of said food receptacle, the force of gravity assists in securing contact between the water receptacles of the ice molding devices and the wall of the food receptacle, an insulating outer covering for said food receptacle, and means for applying refrigerant material to the exterior of said food receptacle.

6. An apparatus for freezing foods comprising an outer substantially cylindrical receptacle, an intermediate substantially cylindrical receptacle on the interior of the outer substantially cylindrical receptacle, heat insulating material between the outer receptacle and the intermediate receptacle, an inner substantially cylindrical food receptacle, the intermediate receptacle and the inner food receptacle being separated by a space, the inner food receptacle having an outwardly extending flange integral therewith and having a sealed connection with the intermediate receptacle to seal the upper end of the space between the inner food receptacle and the intermediate receptacle, a separate sealing device for sealing the lower end of the space between the inner food receptacle and the intermediate receptacle, means for passing refrigerant material through said space between the inner food receptacle and the intermediate receptacle, the wall of the inner food receptacle being inclined inwardly from the top toward the bottom, and an ice molding device on the interior of the inner food receptacle, a support for the ice molding device which resists its longitudinal movement along the inner food receptacle but leaves it free to move toward the wall of the inner food receptacle so that the incline of the wall thereof causes the force of gravity to press the ice molding device against said wall.

7. An apparatus for freezing foods comprising an outer substantially cylindrical receptacle, an intermediate slightly frusto-conic receptacle on the interior of the outer substantially cylindrical receptacle, heat insulating material between the outer receptacle and the intermediate receptacle, an inner slightly frusto-conic food receptacle, the sides of said intermediate and inner receptacles being generally parallel, the intermediate receptacle and the inner food receptacle being separated by a space sealed at its upper and lower ends, and means for passing refrigerant material in a gaseous form through said space around said inner receptacle, in direct contact with the wall of said inner receptacle, to cool the inner receptacle and freeze the food therein, the walls of the inner and intermediate receptacles being inclined inwardly from the top toward the bottom, the inner and intermediate receptacles being larger at the top than at the bottom so that there will be more refrigerant material at the top of the space between them than at the bottom, to act to bring the temperature more nearly the same at the bottom and at the top of the inner food receptacle.

8. An apparatus for freezing foods comprising a substantially cylindrical food receptacle open at one end and closed at the other end and larger in diameter at one end than at the other end so that the wall thereof is inclined inwardly from the top toward the bottom, an ice molding device on the interior of the substantially cylindrical food receptacle having a substantially vertically extending face opposed to the wall of the substantially cylindrical food receptacle, a support connected at one end with the ice molding device, and a carrying member which the other end of said support loosely engages, the wall of the inner substantially cylindrical food receptacle being intermediate the ice molding device and the point of engagement of said support with said carrying member.

9. An evaporator assembly comprising an inner generally cylindrical member having an open end and an opposite end closure integral with said inner member, an outer generally cylindrical member surrounding said inner member and radially outwardly spaced therefrom, said cylindrical members being circumferentially sealed together adjacent their ends, the outer member terminating slightly short of the closed end of the inner member, the assembly being formed to define a continuous tortuous passage between the two members extending entirely about the evaporator, and formed in a series of runs extending generally parallel to the axis of the assembly, and inlet and outlet ducts in communication with said tortuous passage.

10. An evaporator assembly comprising an inner generally cylindrical member having an open end and an opposite end closure integral with said inner member, an outer generally cylindrical member surrounding said inner member and radially outwardly spaced therefrom, said cylindrical members being circumferentially sealed together adjacent their ends, both members being slightly frusto-conic, their diameters increasing toward the open end of the evaporator thus formed, the space between the two members being formed to define a continuous tortuous passage extending entirely about the evaporator, and formed in a series of generally parallel runs, and inlet and outlet ducts in communication with said tortuous passage.

11. The structure of claim 10, including an ice-forming receptacle supported upon the upper edge of the evaporator and in intimate contact with the inner surface thereof.

12. An evaporator assembly comprising an inner generally cylindrical member having an open end and an opposite end closure integral with said inner member, an outer generally cylindrical member surrounding said inner member and radially outwardly spaced therefrom, said cylindrical members being circumferentially sealed together adjacent their ends, one of said members extending slightly beyond the other at said closed end, the assembly being formed to define a continuous tortuous passage between the two members extending entirely about the evaporator, and formed in a series of runs extending generally parallel to the axis of the assembly, and inlet and outlet ducts in communication with said tortuous passage.

WILLARD L. MORRISON.